(12) United States Patent
Lee et al.

(10) Patent No.: US 9,176,527 B2
(45) Date of Patent: Nov. 3, 2015

(54) MOBILE TERMINAL

(75) Inventors: Jang-Won Lee, Seoul (KR);
Young-Bum Kim, Seoul (KR)

(73) Assignee: BLUEBIRD SOFT (KR)

( * ) Notice: Subject to any disclaimer, the term of this patent is extended or adjusted under 35 U.S.C. 154(b) by 1825 days.

(21) Appl. No.: 11/721,357

(22) PCT Filed: Jan. 24, 2006

(86) PCT No.: PCT/KR2006/000260
§ 371 (c)(1),
(2), (4) Date: Jun. 12, 2009

(87) PCT Pub. No.: WO2006/080794
PCT Pub. Date: Aug. 3, 2006

(65) Prior Publication Data
US 2009/0291709 A1    Nov. 26, 2009

(30) Foreign Application Priority Data

Jan. 31, 2005  (KR) .................. 10-2005-0008466

(51) Int. Cl.
*H04M 1/00*    (2006.01)
*G06F 1/16*    (2006.01)
(Continued)

(52) U.S. Cl.
CPC ............ *G06F 1/1626* (2013.01); *G06F 1/1656* (2013.01); *H04M 1/18* (2013.01); *H04M 1/236* (2013.01)

(58) Field of Classification Search
USPC .......... 455/575.1, 575.3, 575.4, 90.3, 428.01, 455/433.01, 433.04, 433.06
See application file for complete search history.

(56) References Cited

U.S. PATENT DOCUMENTS 5,378,882 A * 1/1995 Gong et al. .............. 235/462.45
5,822,192 A   10/1998 Hayashi
(Continued)

FOREIGN PATENT DOCUMENTS

EP        0724380      7/1996
JP      2004016360     1/2004
(Continued)

OTHER PUBLICATIONS

Written Opinion of the International Searching Authority; PCT/KR2006/000260; May 26, 2006.
(Continued)

*Primary Examiner* — Kent Chang
*Assistant Examiner* — Scott Au
(74) *Attorney, Agent, or Firm* — Cantor Colburn LLP

(57) ABSTRACT

A mobile terminal includes an upper casing having at least one exposure opening formed by penetrating a predetermined area thereof, a lower casing coupled to the upper casing to face each other and having an accommodation space formed therein and capable of accommodating an internal part assembly including a printed circuit board, and a middle frame arranged between the upper casing and the lower casing and coupled to the upper casing and the lower casing, and supporting installation parts electrically connected to the internal part assembly and installed such that at least part thereof is exposed to the outside through the exposure opening. A resin mold waterproof ring which is injection molded of synthetic resin having elasticity to have a predetermined width along at least part of an edge portion of the middle frame is integrally coupled to the middle frame and, when the upper casing, the lower casing, and the middle frame are coupled one another, the resin mold waterproof ring is pressed by the upper casing and the lower casing to seal a gap between the upper casing and the lower casing.

14 Claims, 6 Drawing Sheets

(51) Int. Cl.
*H04M 1/18* (2006.01)
*H04M 1/23* (2006.01)

(56) References Cited

U.S. PATENT DOCUMENTS

| | | | |
|---|---|---|---|
| 6,002,884 A * | 12/1999 | Okumura et al. | 396/25 |
| 6,041,120 A | 3/2000 | Olkkola | |
| 6,532,152 B1 | 3/2003 | White et al. | |
| 6,731,913 B2 | 5/2004 | Humphreys et al. | |
| 6,914,774 B1 * | 7/2005 | Albertini et al. | 361/679.09 |
| 2003/0013418 A1* | 1/2003 | Kato | 455/90 |
| 2003/0219117 A1 | 11/2003 | Sun | |
| 2004/0085251 A1* | 5/2004 | Shimura | 343/872 |

FOREIGN PATENT DOCUMENTS

| | | |
|---|---|---|
| JP | 2004296957 | 10/2004 |
| KR | 1020040088365 | 10/2004 |

OTHER PUBLICATIONS

International Search Report; PCT/KR2006/000260; May 26, 2006.
All references cited in the Written Opinion and Search Report, and not previously submitted, are listed above.

European Search Report—EP06703618.6 dated Aug. 10, 2012.

* cited by examiner

Fig. 7
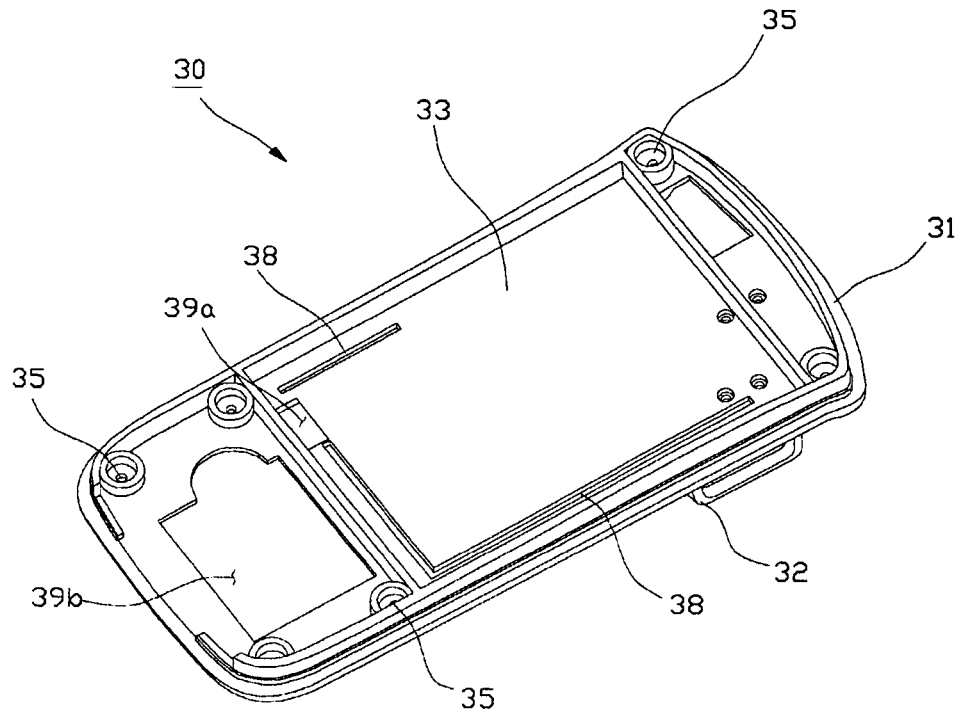
[Fig. 8]
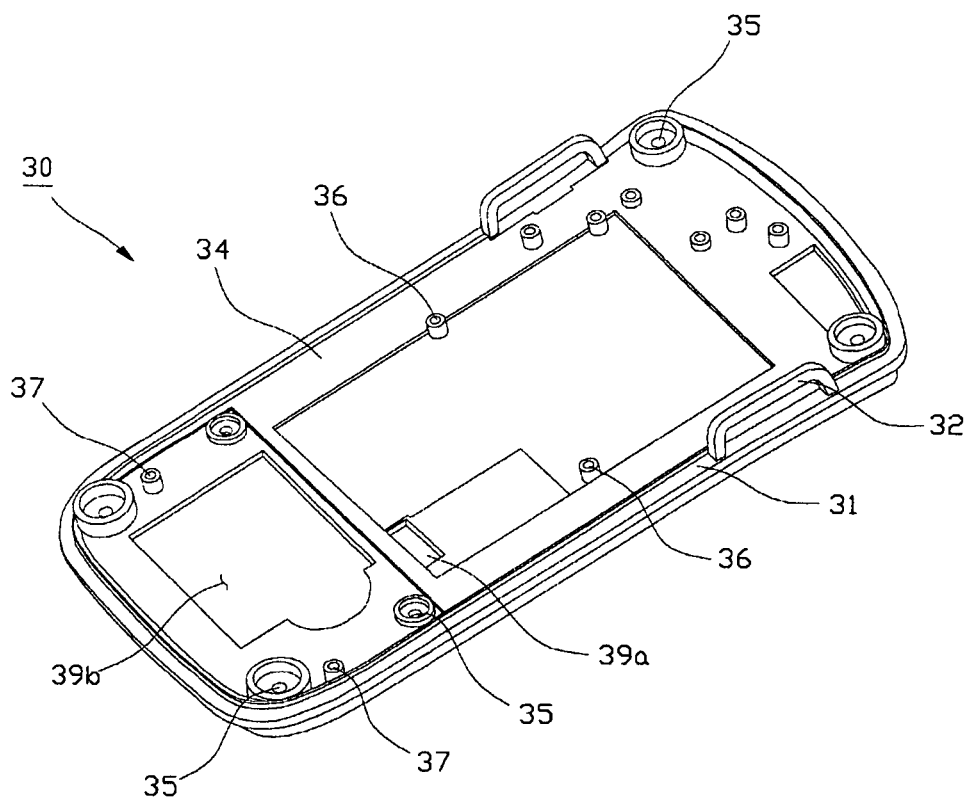

MOBILE TERMINAL

TECHNICAL FIELD

The present invention relates to a mobile terminal, and more particularly, to a mobile terminal having a simple structure, a simplified assembly process, and a waterproof function.

BACKGROUND ART

In general, mobile terminals can be freely-used regardless of places while a user moves. Mobile communication terminals such as mobile phones and personal digital assistants (PDAs) that are referred to as personal portable terminals are typical mobile terminals. The words "mobile terminal" used herein include all the above devices. However, in the following description, the words "mobile terminal" are limited to the PDAs for the convenience of explanation.

In a complicated and diverse society, individuals need to keep or maintain information for one's own purpose. A variety of products are released in a market to meet the needs of individuals and one of the products is a PDA. The PDA is referred to as a pocket computer and signifies a palm size compact device having a calculation function or an information storing and search function for a personal use or business use. Usually, the PDA is widely used to maintain schedule calendar and address information.

In particular, PDAs for an industrial use are widely used mainly for logistics industry and the market is gradually expanding. The industrial PDA has multiple office functions such as a bar code scanner or a card reader that is not present in a general PDA. The use of the industrial PDA makes delivery, information management, and other related business efficient. For example, in an insurance company, an insurance planner can process various insurance related business such as client information management, client search, schedule management, consultation diary management, celebration day search, and fund calculation process, directly at the site using the industrial PDA. In a hospital, medical staff members can input or search patient treatment records, a case history, and an image or graphic material such as an X-ray image, using the industrial PDA without a limit in time and place. In the business of police, the use of the industrial PDA can remarkably reduce the outside duty time of a traffic or guard policeman by making a fine for a violation of traffic rules paid immediately at a bank which would have been paid after 2-3 days from disposition.

The industrial PDA which is widely used in the above-mentioned diverse industrial fields must meet requirements over a predetermined level to endure industrial environment that is not a general environment unlike the general PDA. That is, unlike the general PDA, the industrial PDA may be used in a refrigerator under −10° C. or below or outdoors for a long time. Also, since a postman, for example, may toughly use the industrial PDA, the industrial PDA must have anti-shock, waterproof, and anti-heat/freezing functions over a predetermined level so as to have a competition. Thus, the industrial PDA must be manufactured more firmly and hard than the general PDA and necessarily has a waterproof function to endure snow or rain. Accordingly, since the industrial PDA is designed to meet the above requirements such as anti-shock, waterproof, and anti-heat/freezing functions over a predetermined level and a barcode scanner needs to be installed as described above, the size of the PDA is normally relatively large so that the size of the general PDA need to be reduced for the Asian users whose hands are relatively smaller than those of Westerners.

However, for a conventional mobile terminal, in particular, the industrial PDA, to have a waterproof function, a gap between an upper casing and a lower casing is sealed by coating a sealing member during an assembly process. Thus, in this technique, since the coating is manually performed, a manufacturing process becomes complicated. Also, when the upper casing and the lower casing are disassembled for repair, since the gap needs to be coated again with the sealing member, reassembly is deteriorated. Furthermore, the structure of the industrial PDA becomes complicated and it is difficult to reduce the size of a product of this type.

DISCLOSURE OF INVENTION

Technical Problem

To solve the above and/or other problems, the present invention provides a mobile terminal which can not only provide a simple structure and a simplified assembly process but also be easy to reassemble after being disassembled for repair, reduce the size thereof compared to a conventional product, and have a waterproof function.

Also, the present invention provides a mobile terminal which can efficiently support an internal part assembly including a printed circuit board and a liquid crystal display which are generally installed on the mobile terminal so that the internal structure is simplified and the assembly thereof is made easy.

Technical Solution

According to an aspect of the present invention, a mobile terminal comprises an upper casing having at least one exposure opening formed by penetrating a predetermined area thereof, a lower casing coupled to the upper casing to face each other and having an accommodation space formed therein and capable of accommodating an internal part assembly including a printed circuit board, and a middle frame arranged between the upper casing and the lower casing and coupled to the upper casing and the lower casing, and supporting installation parts electrically connected to the internal part assembly and installed such that at least part thereof is exposed to the outside through the exposure opening, wherein a resin mold waterproof ring which is injection molded of synthetic resin having elasticity to have a predetermined width along at least part of an edge portion of the middle frame is integrally coupled to the middle frame and, when the upper casing, the lower casing, and the middle frame are coupled one another, the resin mold waterproof ring is pressed by the upper casing and the lower casing to seal a gap between the upper casing and the lower casing.

The exposure opening of the upper casing includes a screen opening which is open so that a screen is viewed from the outside, the installation part includes a liquid crystal display, and the middle frame contacts and supports the liquid crystal display that is installed such that the screen is exposed to the outside through the screen opening at a front wall portion and contacts and supports the internal part assembly at a rear wall portion.

The middle frame and the resin mold waterproof ring are provided in a double injection molding method, which is advantageous in productivity.

The middle frame is made of a plastic frame (polycarbonate and glass fiber 20%) and the resin mold waterproof ring is made of urethane.

The resin mold waterproof ring further includes a button ring having a ring shape to encompass an edge of a side button electrically connected to the internal part assembly and installed at side portions of the upper casing and the lower casing.

A plurality of coupling holes are formed to penetrate the middle frame, a coupling member coupling the upper casing and the lower casing passes through at least one of the coupling holes, and, when the upper casing, the lower casing, and the middle frame are coupled one another, the resin mold waterproof ring is pressed by the upper casing and the lower casing in opposite directions and maintains a compressed and deformed state compared to the original state, which is advantageous in waterproof.

The resin mold waterproof ring has a closed loop shape along the entire edge of the middle frame and an outer portion of the resin mold waterproof ring is exposed to the outside between the upper and lower casings when the upper casing, the lower casing, and the middle frame are coupled to one another, which produces aesthetic external appearance.

The mobile terminal is an industrial PDA.

Advantageous Effects

As described above, according to the present invention, a simple structure can be embodied and the assembly process can be simplified. When the mobile terminal is disassembled for repair and then reassembled, the reassembly is made easy and the size of the mobile terminal can be reduced compared to the conventional product while having a waterproof function.

Furthermore, since the middle frame is configured to contact and support the LCD that is installed such that a screen is exposed to the outside through the screen opening at the front wall portion, and contact and support the internal part assembly at the rear wall portion, the internal part assembly and the LCD can be supported in an efficient structure so that the inner structure is simplified and the assembly is simplified as well.

BRIEF DESCRIPTION OF THE DRAWINGS

FIG. 7 is a front perspective view of a middle frame of the industrial PDA of FIG. 1;
FIG. 8 is a rear perspective view of the middle frame of the industrial PDA of FIG. 1.

BEST MODE FOR CARRYING OUT THE INVENTION

Figure 1:
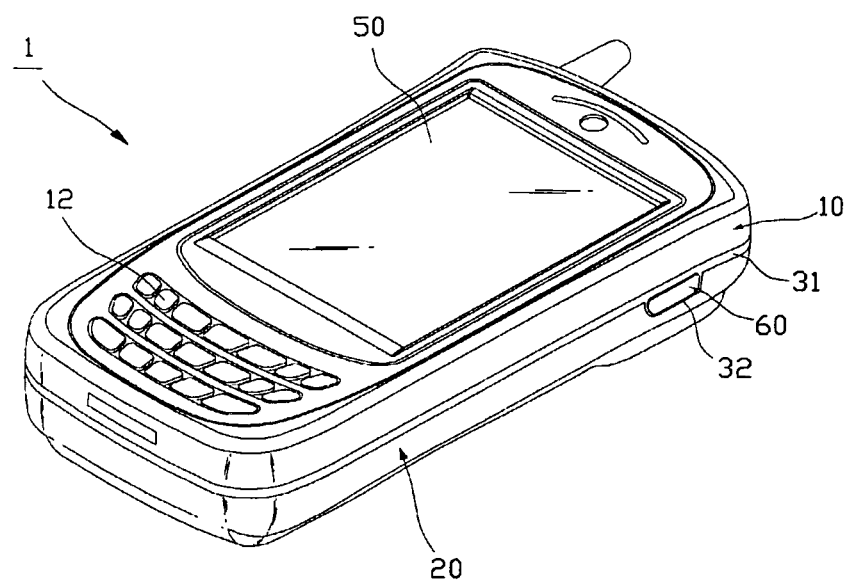
FIG. 1 is a perspective view of an industrial PDA according to an embodiment of the present invention.

The attached drawings for illustrating preferred embodiments of the present invention are referred to in order to gain a sufficient understanding of the present invention, the merits thereof, and the objectives accomplished by the implementation of the present invention.

Hereinafter, the present invention will be described in detail by explaining preferred embodiments of the invention with reference to the attached drawings. Like reference numerals in the drawings denote like elements.

The present invention can be variously applied to mobile terminals such as personal digital assistants (PDAs) including personal portable terminals for an industrial purpose and personal portable terminals for a general purpose, regardless of the type thereof whether it is a flip type or folder type. However, the following description will focus on the flip type industrial PDA.

Figure 2:
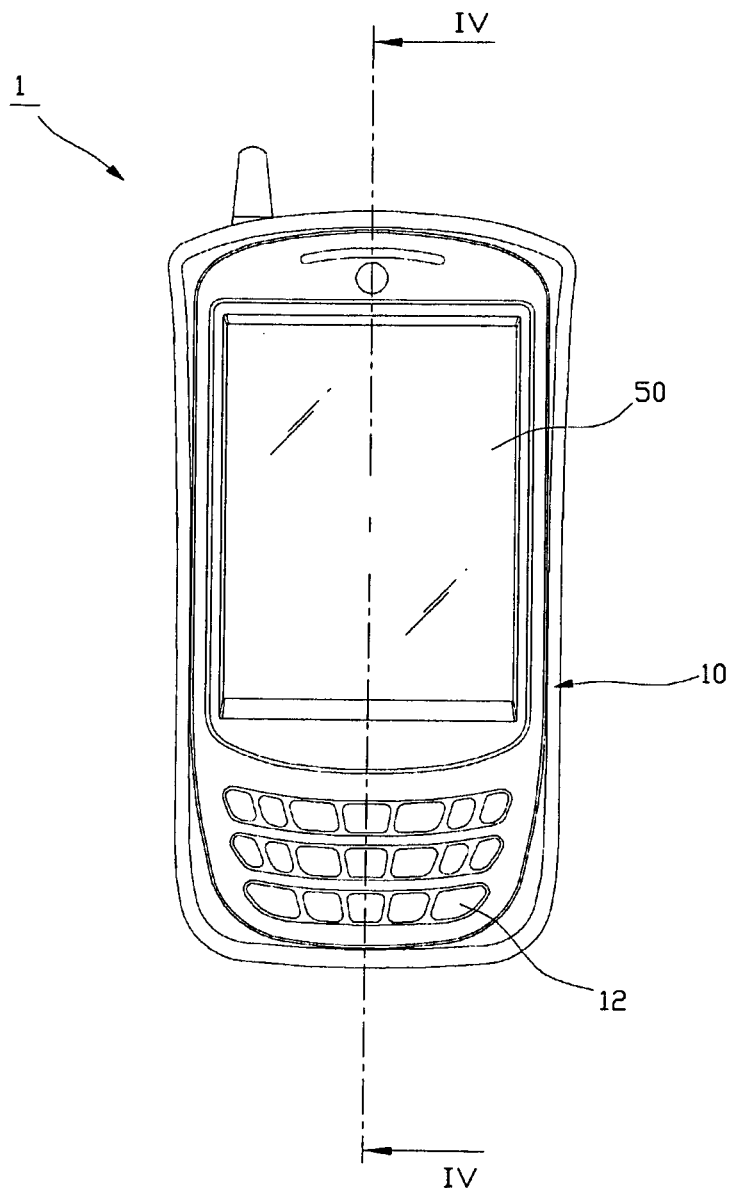
FIG. 2 is a front view of the industrial PDA of FIG. 1.
Figure 3:
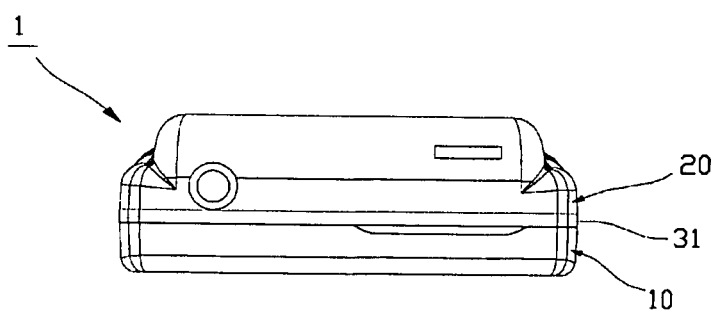
FIG. 3 is a plan view of the industrial PDA of FIG. 2.
Figure 4:
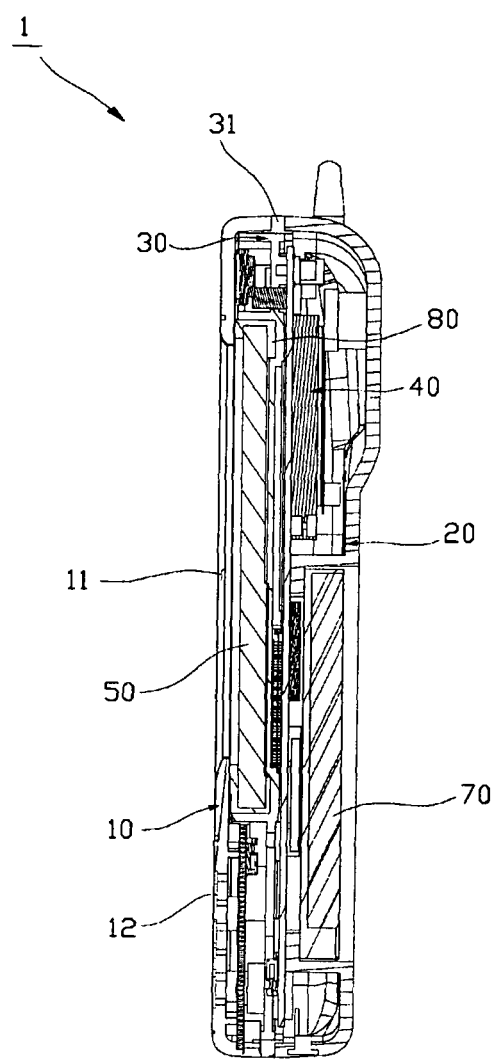
FIG. 4 is a cross-sectional view taken along line IV-IV of FIG. 2.
Figure 5:
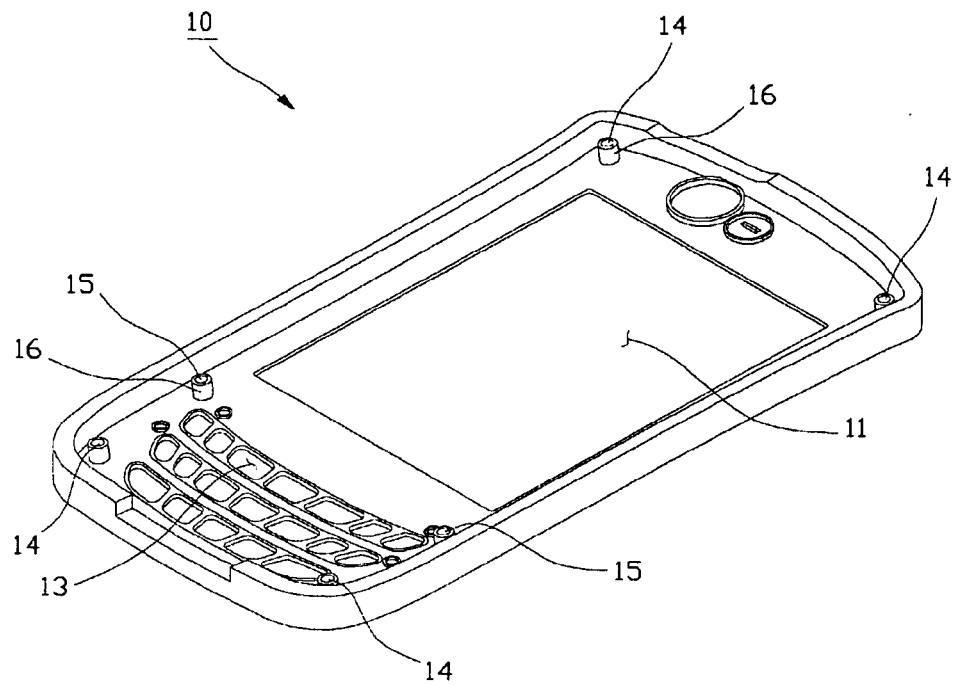
FIG. 5 is a rear perspective view of an upper casing of the industrial PDA of FIG. 1.
Figure 6:
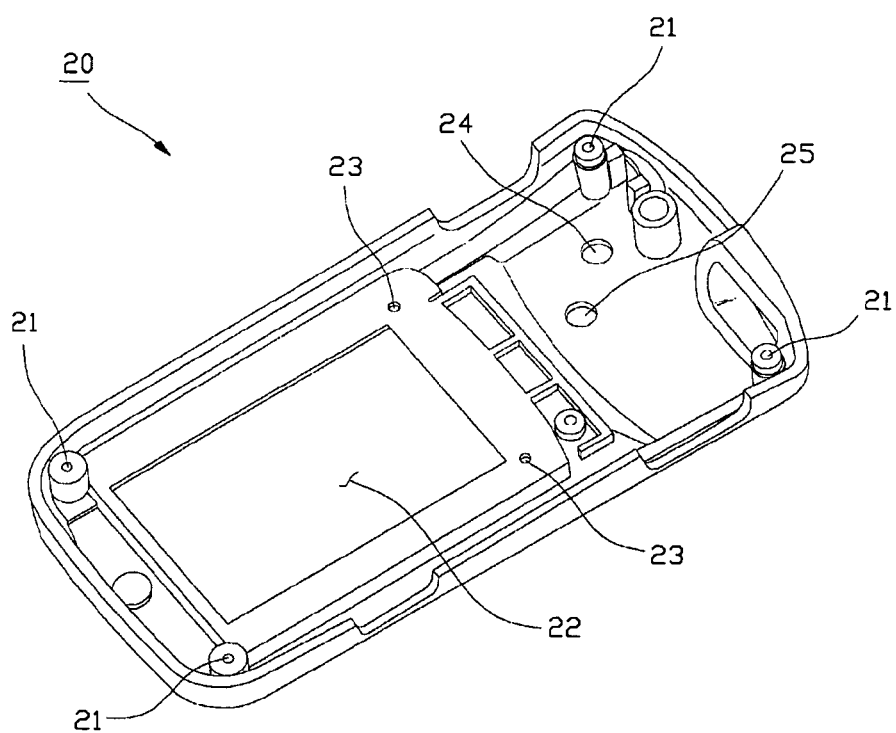
FIG. 6 is a rear perspective view of a lower casing of the industrial PDA of FIG. 1.
Figure 9:
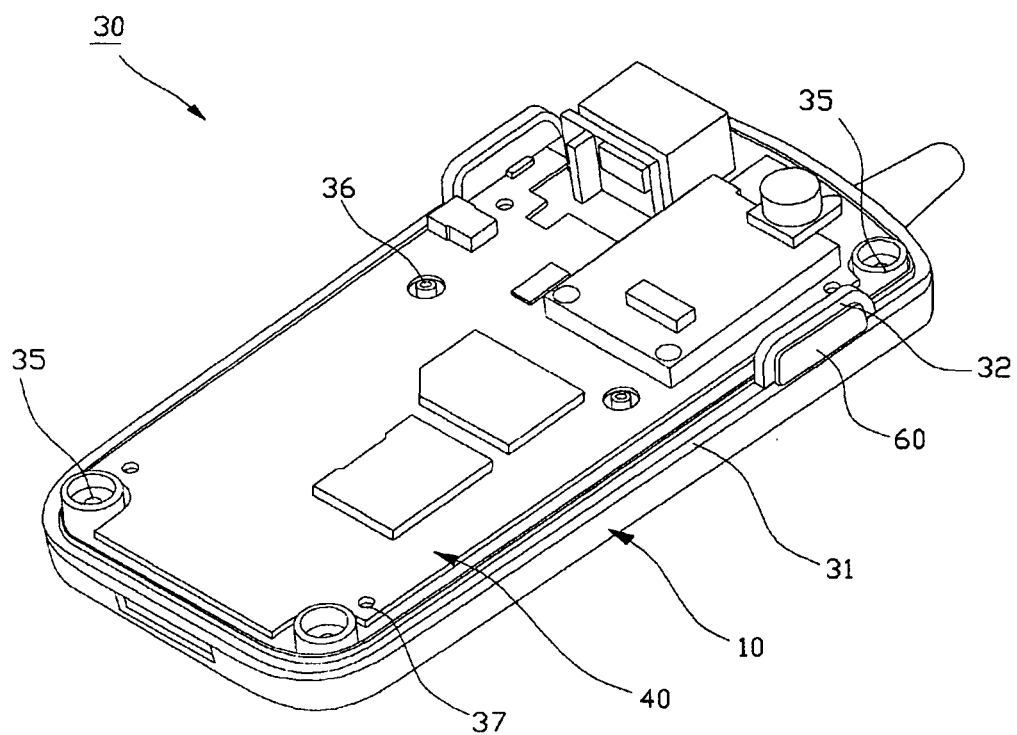
FIG. 9 is a perspective view of the industrial PDA of FIG. 1 in which the lower casing is removed.

FIG. 1 is a perspective view of an industrial PDA according to an embodiment of the present invention. FIG. 2 is a front view of the industrial PDA of FIG. 1. FIG. 3 is a plan view of the industrial PDA of FIG. 2. FIG. 4 is a cross-sectional view taken along line IV-IV of FIG. 2. FIG. 5 is a rear perspective view of an upper casing of the industrial PDA of FIG. 1. FIG. 6 is a rear perspective view of a lower casing of the industrial PDA of FIG. 1. FIG. 7 is a front perspective view of a middle frame of the industrial PDA of FIG. 1. FIG. 8 is a rear perspective view of the middle frame of the industrial PDA of FIG. 1. FIG. 9 is a perspective view of the industrial PDA of FIG. 1 in which the lower casing is removed.

As shown in the above drawings, an industrial PDA 1 according to an embodiment of the present invention includes an upper casing 10 having at least one exposure opening 11 where a predetermined area is penetrated, a lower casing 20 coupled to the upper casing 10 to face each other and forming an inner accommodation space where an internal part assembly 40 including a printed circuit board (PCB, not shown) is accommodated, and a middle frame 30 arranged in the middle between the upper and lower casings 10 and 20 to be coupled to the respective upper and lower casings 10 and 20 and supporting an installation part 50 electrically connected to the internal part assembly 40 and installed such that at least a part thereof is exposed to the outside through the exposure opening 11.

A resin mold waterproof ring 31 which will be described in detail later is formed of urethane that is synthetic resin having elasticity in an injection molding method in a predetermined width along an edge portion of the middle frame 30, and is integrally coupled with the middle frame 30. When the upper casing 10, the lower casing 20, and the middle frame 30 are coupled to one another, the resin mold waterproof ring 31 seals a gap between the upper and lower casings 10 and 20 as shown in FIG. 1 while the upper and lower casings 10 and 20 are pressed to contact each other in the opposite directions by the edge portions of the upper and lower casings 10 and 20. In the present embodiment, the exposure opening 11 of the upper casing 10 includes a screen opening 11 that is open so that a screen can be viewed from the outside. The above-mentioned installation part 50 includes a liquid crystal display (LCD) 50. The resin mold waterproof ring 31 is manufactured of urethane. Thus, in the present embodiment, the middle frame 30 contacts and supports the LCD 50 installed such that the screen is exposed to the outside through the screen opening 11, at a front wall portion 33, and contacts and supports the internal part assembly 40 which will be described later at the rear wall portion 34.

In the present embodiment, the middle frame 30 and the resin mold waterproof ring 31 are continuously manufactured in a double injection molding method. As described above, the resin mold waterproof ring 31 is manufactured of synthetic resin having elasticity, for example, urethane. Since the resin mold waterproof ring 31 has elasticity, when the upper and lower casings 10 and 20 are coupled with the middle frame 30 interposed therebetween, the resin mold waterproof ring 31 is inwardly pressed and contracted by the edge portions of the upper and lower casings 10 and 20 and closely contacts toward the upper and lower casings 10 and 20 to seal the gap between the upper and lower casings 10 and 20. Thus, the waterproof function of the industrial PDA 1 according to the present embodiment is obtained so that water is prevented from intruding in the gap between the upper and lower casings 10 and 20 when the industrial PDA 1 contacts the water.

Since the upper and lower casings 10 and 20 are coupled to face each other, an accommodation space is formed therein. The middle frame 30 arranged in the middle of the upper and lower casings 10 and 20 roughly divides the accommodation space into two. The internal part assembly 40 is accommodated in the accommodation space between the middle frame 30 and the lower casing 20 to be supported by the rear wall portion 34 of the middle frame 30 to contact each other. The LCD 50 is accommodation space between the middle frame 30 and the upper casing 10 to be supported by the front wall portion 33 of the middle frame 30 to contact each other.

As shown in FIGS. 1, 2, and 5, the upper casing 10 includes a plurality of button holes 13 cut according to the positions of a plurality of signal input buttons 12 so that the signal input buttons 12 can be exposed to the outside, and the screen opening 11 cut so that the LCD 50 is exposed to the outside. Four first coupling holes 14, in which screws (not shown) that are coupling members passing through the lower casing 20 and the middle frame 30 are screw-coupled, are respectively provided at the four corners of the upper casing 10. Two first frame coupling holes 15 are located at the upper portion of the button holes 13, in which screws passing through coupling holes 35 of the middle frame 30 which will be described later are coupled. The middle frame 30 and the upper casing 10 only are secondarily coupled by the screws. The first frame coupling holes 15 and the first coupling holes 14 are provided in coupling protrusions 16 having hollow cylindrical shapes and protruding from the surface. A female screw, to which the screw that is the coupling member is coupled, is formed on an inner wall of each of the coupling protrusions 16 forming the first coupling holes 14 in an insert injection molding method.

Next, as shown in FIGS. 1, 2, 4, and 6, in particular, in FIG. 6, the lower casing 20 includes four second coupling holes 21 provided at the four corners thereof. The screws that are the coupling members passing through the second coupling holes 21 pass through the coupling holes 35 of the middle frame 30 and finally screw-coupled to the first coupling holes 14 of the upper casing 10. Accordingly, the lower casing 20 and the upper casing 10 are coupled to each other with the middle frame 30 interposed therebetween. In the lower casing 20, a battery hole 22 is formed by cutting a predetermined area so that a battery 70 is electrically connected to the PCB as shown in FIG. 4. A second frame coupling hole 23 is provided at both sides of the upper portion of the battery hole 22. A screw passes through the second frame coupling hole 23 and the screw is screw-coupled to a fixing hole 36 of the middle frame 30 which will be described later to couple the middle frame 30 and the lower casing 20. Two holes arranged above the second frame coupling hole 23 are a lens hole 24 and a flash hole 25 so that a lens unit (not shown) and a flash unit (not shown) installed on the internal part assembly 40 are exposed to the outside through the holes.

Referring to FIGS. 7 and 8, the six coupling holes 35 are formed to penetrate the middle frame 30. As described above, the screws passing through the coupling holes 35 provided at the four corners penetrate the lower casing 20 and finally screw-coupled to the first coupling holes 14 of the upper casing 10. The screws passing through the upper two coupling holes 35 provided around a key pad portion are coupled to the upper casing 10 without penetrating the lower casing 20 so as to couple the middle frame 30 and the upper casing 10 only.

The resin mold waterproof ring 31 is having elasticity and a close loop shape along the overall edge of the middle frame 30 is integrally coupled to the middle frame 30. The resin mold waterproof ring 31 has a ring shaped button ring 32. The button ring 32 encompasses the edge of a side button 60 that is electrically connected to the internal part assembly 40 and installed at the side portion. For example, in the present embodiment, the button ring 32 is formed to encompass the edge of a barcode operation button 60 to operate a barcode scanner. As shown in FIG. 1, when the final assembly is completed, the button ring 32 seals gaps between the barcode operation button 60 and the upper casing 10 and between the barcode operation button 60 and the lower casing 20. In the present embodiment, the middle frame 30 and the resin mold waterproof ring 31 are manufactured in a double injection molding method as described above. The middle frame 30 is made of a plastic frame (polycarbonate (PC) and glass fiber 20%) while the resin mold waterproof ring 31 is made of urethane.

The double injection molding method uses two different types of resin or two different colors of resin and an injection machine having two injectors and a rotary mechanism installed on a mobile plate or a mold designed capable of double injection using a core or slide structure, to form a mold by filling a space between a first mold product that is initially molded and a second cavity with a secondary resin. Since the cavities at the first and second molds are accurately overlapped, the shape of a mold can be freely designed and the application of a product is wide so that a variety of designs are available. Also, comparing the conventional general injection in which two parts are molded through two steps and a product is finally obtained through a secondary process such as a welding or coating step, in the present embodiment, by performing injection only one time, the process is simplified, the cost is reduced, and manufacturing of products having various designs is possible. In the present embodiment, the middle frame 30 corresponds to the first mold product and the resin mold waterproof ring 31 is produced from the second mold.

Since the resin mold waterproof ring 31 coupled to the edge portion of the middle frame 30 is manufactured of urethane and has elasticity, when the upper casing 10, the lower casing 20, and the middle frame 30 are coupled to one another, the resin mold waterproof ring 31 is pressed by the upper and lower casings 10 and 20 and maintained as being compressed and deformed so that the gap between the upper and lower casings 10 and 20 is sealed in a closely contact state, thus providing a waterproof function. Also, since the outer portion of the resin mold waterproof ring 31 is exposed to the outside along the edge between the upper and lower casings 10 and 20 when the upper casing 10, the lower casing 20, and the middle frame 30 are coupled to one another, aesthetic outside appearance is provided.

Referring to FIG. 7, an accommodation groove 38 is formed in the front wall portion 33 of the middle frame 30 inwardly recessed from the surface of the front wall portion 33 to a predetermined depth to install the LCD 50. An LCD support rubber 80 shown in FIG. 4 is attached to the accommodation groove 38. The LCD 50 is installed in the LCD support rubber 80 to protect the LCD 50 from an external shock. A connection opening 39a is formed in the middle frame 30 so that the LCD 50 can be electrically connected to the PCB. The key pad portion installed on the upper casing 10 can be electrically connected to the internal part assembly 40 through a button connection hole 39b at the lower end portion thereof.

The inner part assembly 40 including the PCB contacts the rear wall portion 34 of the middle frame 30 shown in FIGS. 8 and 9 and is supported by the same. A plurality of board installation holes 37 are provided at the rear wall portion 34 of the middle frame 30. As the internal part assembly 40 is positioned on the middle frame 30 and the screws are coupled to the board installation holes 37, the internal part assembly 40 is fixed to the middle frame 30. The screw is coupled to the fixing hole 36 provided at the rear wall portion 34 of the middle frame 30 to couple the lower casing 20 and the middle frame 30.

The internal part assembly 40 includes the PCB, various parts electrically connected to the PCB, a ROM storing an operating system of a system, and a RAM storing application programs and data. The configuration of the internal part assembly 40 can be changed according to the type of the industrial PDA 1.

Unlike the conventional waterproof method in which a sealing members is inconveniently and manually installed in the gap between the upper and lower casings 10 and 20 and the conventional support method in which the internal part assembly 40 and the LCD 50 are supported using various brackets installed on the upper and lower casings 10 and 20, in the industrial PDA 1 according to the present embodiment, the internal part assembly 40 and the LCD 50 are supported by the middle frame 30 and simultaneously the resin mold waterproof ring 31 is provided at the edge portion of the middle frame 30 in the double injection molding method. Thus, when the upper and lower casings 10 and 20 are coupled to each other, the resin mold waterproof ring 31 seals the gap between the upper and lower casings 10 and 20 in a compressed state. As a result, the industrial PDA 1 has a simple structure, the assembly process is much simplified compared to the conventional technique, and the size of the industrial PDA 1 is reduced while providing a waterproof structure.

In the operation of the mobile terminal configured as above according to the above embodiment, first, the internal part assembly 40 and the LCD 50 are provided. The upper and lower casings 10 and 20 are provided through injection mold. The middle frame 30 to which the resin mold waterproof ring 31 is coupled is manufactured in the double injection molding method. In the method of manufacturing the middle frame 30 to which the resin mold waterproof ring 31 is integrally coupled in the double injection molding method, the middle frame 30 is first injection molded using a plastic frame and then the resin mold waterproof ring 31 having the button ring 32 along the edge portion of the middle frame 30 is secondly injection molded using urethane. That is, after the middle frame 30 is first injection molded using the plastic frame, the resin mold waterproof ring 31 is continuously secondly injection molded using the urethane so that the middle frame 30 having the resin mold waterproof ring 31 incorporated therein is manufactured.

Next, the LCD support rubber 80 is installed in the accommodation groove 38 provided at the front wall portion 33 of the middle frame 30. The LCD 50 is installed inside the LCD support rubber 80. The internal part assembly 40 including the PCB is installed at the rear wall portion 34 of the middle framer 30. Then, the when the upper and the lower casings 10 and 20 are coupled to each other with respect to the middle frame 30 interposed therebetween, the resin mold waterproof ring 31 provided at the edge portion of the lower casing 20 is pressed by the edge portions of the upper and lower casings 10 and 20, thus sealing the gap between the upper and lower casings 10 and 20. That is, the screws that are the coupling member are screw-coupled to the first coupling holes 14 of the upper casing 10 by passing through the second coupling holes 21 of the lower casing 20 and the coupling holes 35 of the middle frame 30, the edge portions of the upper and lower casings 10 and 20 press the resin mold waterproof ring 31 in the opposite directions. Accordingly, the gap between the upper and lower casings 10 and 20 are sealed by the resin mold waterproof ring 31. Since the resin mold waterproof ring 31 has elasticity, the resin mold waterproof ring 31 is installed between the upper and lower casings 10 and 20 to closely contact them in a pressed state. Thus, when the industrial PDA 1 contacts water, the water is prevented from intruding through the gap between the upper and lower casings 10 and 20 so that the waterproof function is completed. The button ring 32 of the resin mold waterproof ring 31 encompasses the barcode operation button 60 so that the gap between the barcode operation button 60 and the upper casing 10 and the gap between the barcode operation button 60 and the lower casing 20 are sealed.

The industrial PDA 1 according to the present embodiment that is assembled through the simplified assembly process has a size that is reduced compared to the conventional technique. Also, since the outer portion of the resin mold waterproof ring 31 having a different color is exposed between the upper and lower casings 10 and 20, the outer appearance of the industrial PDA 1 becomes more aesthetic.

Although the above-described embodiment focuses on the flip type industrial PDA and the front wall portion of the middle frame supports the LCD, the same technical concept applied to a variety of mobile terminals. For example, the structure according to the present invention can be applied to a main body of a mobile phone having a key pad portion in a folder type mobile phone. In this case, while the middle frame supporting the key pad portion is provided, the resin mold waterproof ring that is double injection molded is provided at the edge portion of the middle frame so that the upper and lower casings are coupled to each other with respect to the middle frame interposed therebetween.

In the above-described embodiment, the middle frame and the resin mold waterproof ring coupled along the edge of the middle frame are provided in the double injection mold method. However, it is possible to first inject mold the middle frame and use the same as an insert, that is, the middle frame that is first injection molded is placed in an injection mold and the resin mold waterproof ring is injection molded along the edge thereof, which is an insert injection molding method. Although in the above-described embodiment the resin mold waterproof ring is manufactured of urethane, any material capable of maintaining elasticity and sealing can be used, for example, elastomer or soft PVC.

In the above-described embodiment, the resin mold waterproof ring is formed to have a closed shape along the entire edge of the middle frame. The outer portion of the resin mold waterproof ring is exposed to the outside between the upper and lower casings when the upper casing, the lower casing, and the middle frame are coupled to one another. The resin mold waterproof ring may have a partially cut shape to avoid interference. Also, when the outer portion of the resin mold waterproof ring does not need to be exposed to the outside, the shape of the edge portion of the upper and lower casings has a stepped shape in which the thickness of the outer side is thicker. Thus, the outer portion of the resin mold waterproof ring may not be exposed to the outside.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

As described above, according to the present invention, a simple structure can be embodied and the assembly process can be simplified. When the mobile terminal is disassembled for repair and then reassembled, the reassembly is made easy and the size of the mobile terminal can be reduced compared to the conventional product while having a waterproof function.

Furthermore, since the middle frame is configured to contact and support the LCD that is installed such that a screen is exposed to the outside through the screen opening at the front wall portion, and contact and support the internal part assembly at the rear wall portion, the internal part assembly and the LCD can be supported in an efficient structure so that the inner structure is simplified and the assembly is simplified as well.

What is claimed is:

1. A mobile terminal comprising:
    an upper casing having at least one exposure opening formed by penetrating a predetermined area thereof;
    a lower casing coupled to the upper casing to face each other and having an accommodation space formed therein and capable of accommodating an internal part assembly including a printed circuit board; and
    a middle frame arranged between the upper casing and the lower casing and coupled to the upper casing and the lower casing, and supporting installation parts electrically connected to the internal part assembly and installed such that at least part thereof is exposed to the outside through the exposure opening,
    wherein a resin mold waterproof ring which is injection molded of synthetic resin having elasticity to have a predetermined width along at least part of an edge portion of the middle frame, is integrally coupled to the middle frame and is in contact with the middle frame, and
    when the upper casing, the lower casing, and the middle frame are coupled one another, the resin mold waterproof ring contacts the upper casing and the lower casing to seal a gap between the upper casing and the lower casing such that the resin mold waterproof ring is exposed to the outside.

2. The mobile terminal of claim 1, wherein the exposure opening of the upper casing includes a screen opening which is open so that a screen is viewed from the outside, the installation part includes a liquid crystal display, and the middle frame contacts and supports the liquid crystal display that is installed such that the screen is exposed to the outside through the screen opening at a front wall portion and contacts and supports the internal part assembly at a rear wall portion.

3. The mobile terminal of claim 2, wherein the middle frame and the resin mold waterproof ring are provided in a double injection molding method.

4. The mobile terminal of claim 3, wherein the middle frame is made of a plastic frame (polycarbonate and glass fiber 20%) and the resin mold waterproof ring is made of urethane.

5. The mobile terminal of claim 2, wherein the resin mold waterproof ring further includes a button ring having a ring shape to encompass an edge of a side button electrically connected to the internal part assembly and installed at side portions of the upper casing and the lower casing.

6. The mobile terminal of claim 2, wherein a plurality of coupling holes are formed to penetrate the middle frame, a coupling member coupling the upper casing and the lower casing passes through at least one of the coupling holes, and, when the upper casing, the lower casing, and the middle frame are coupled one another, the resin mold waterproof ring is pressed by the upper casing and the lower casing in opposite directions and maintains a compressed and deformed state compared to the original state.

7. The mobile terminal of claim 2, wherein the resin mold waterproof ring has a closed loop shape along the entire edge of the middle frame and an outer portion of the resin mold waterproof ring is exposed to the outside between the upper and lower casings when the upper casing, the lower casing, and the middle frame are coupled to one another.

8. The mobile terminal of claim 1, wherein the mobile terminal is an industrial PDA.

9. The mobile terminal of claim 2, wherein the mobile terminal is an industrial PDA.

10. The mobile terminal of claim 3, wherein the mobile terminal is an industrial PDA.

11. The mobile terminal of claim 4, wherein the mobile terminal is an industrial PDA.

12. The mobile terminal of claim 5, wherein the mobile terminal is an industrial PDA.

13. The mobile terminal of claim 6, wherein the mobile terminal is an industrial PDA.

14. The mobile terminal of claim 7, wherein the mobile terminal is an industrial PDA.

* * * * *